(12) United States Patent
Cheng et al.

(10) Patent No.: US 11,915,313 B2
(45) Date of Patent: Feb. 27, 2024

(54) USING EMAIL HISTORY TO ESTIMATE CREDITWORTHINESS FOR APPLICANTS HAVING INSUFFICIENT CREDIT HISTORY

(71) Applicant: Capital One Services, LLC, McLean, VA (US)

(72) Inventors: Lin Ni Lisa Cheng, New York, NY (US); Joshua Edwards, Philadelphia, PA (US); Phoebe Atkins, Rockville, VA (US); Max Miracolo, Brooklyn, NY (US); Cruz Vargas, Denver, CO (US); Brian McClanahan, Silver Spring, MD (US); Alexander Lin, Arlington, VA (US); Louis Buell, Chevy Chase, MD (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/445,136

(22) Filed: Aug. 16, 2021

(65) Prior Publication Data

US 2023/0048345 A1 Feb. 16, 2023

(51) Int. Cl.
*G06Q 40/00* (2023.01)
*G06Q 40/03* (2023.01)
*G06F 40/58* (2020.01)
*G06F 40/289* (2020.01)
*G06N 20/00* (2019.01)

(52) U.S. Cl.
CPC ........... *G06Q 40/03* (2023.01); *G06F 40/289* (2020.01); *G06F 40/58* (2020.01); *G06N 20/00* (2019.01)

(58) Field of Classification Search
CPC ...... G06Q 40/02; G06Q 40/025; G06Q 40/03; G06F 40/58; G06F 40/289; G06N 20/00
USPC .................................................. 705/4, 35–45
See application file for complete search history.

(56) References Cited

U.S. PATENT DOCUMENTS

| | | | |
|---|---|---|---|
| 11,429,957 B1* | 8/2022 | Eidam | G06Q 40/03 |
| 11,444,893 B1* | 9/2022 | Kalluri | G06N 20/00 |
| 2013/0218608 A1* | 8/2013 | Huson | G06Q 50/12 |
| | | | 705/5 |
| 2013/0332339 A1 | 12/2013 | Chung et al. | |
| 2018/0115899 A1* | 4/2018 | Kedem | G06F 21/31 |
| 2018/0204280 A1* | 7/2018 | Painter | G06Q 40/08 |

(Continued)

*Primary Examiner* — Jessica Lemieux
*Assistant Examiner* — Mohammed H Mustafa
(74) *Attorney, Agent, or Firm* — Harrity & Harrity, LLP (57) ABSTRACT

In some implementations, a credit decision platform may receive a credit request from an applicant and obtain domestic historical data associated with the applicant from a credit bureau device. The credit decision platform may obtain access to an email account associated with the applicant based on determining that the domestic historical data associated with the applicant is insufficient to process the credit request. The credit decision platform may identify, using one or more machine learning models, a set of email messages included in the email account that are relevant to the credit request and may analyze content included in the set of email messages to generate non-domestic historical data associated with the applicant. The credit decision platform may generate a decision on the credit request based on an estimated creditworthiness of the applicant, which may be determined based on the non-domestic historical data.

20 Claims, 6 Drawing Sheets (56) References Cited

U.S. PATENT DOCUMENTS

2020/0202317 A1* 6/2020 Cassel .................... G06Q 40/03
2022/0261886 A1* 8/2022 Patchava ................ G06Q 40/02

* cited by examiner

USING EMAIL HISTORY TO ESTIMATE CREDITWORTHINESS FOR APPLICANTS HAVING INSUFFICIENT CREDIT HISTORY

BACKGROUND

There are various credit products available to consumers, including vehicle loans, mortgage loans, home equity loans, student loans, personal loans, lines of credit, and/or credit cards, among other examples. When a person submits an application or a request to pre-qualify for a credit product (e.g., prior to submitting an application), a lender or creditor (e.g., a bank, a credit union, a mortgage company, a vehicle financing company, and/or a credit card company) typically evaluates a creditworthiness of the potential borrower to render a decision on the application or pre-qualification request and/or determine credit terms that the lender or creditor is willing to offer. For example, creditworthiness generally refers to a measure (e.g., a probability of default) that lenders or creditors use to determine how well a credit applicant handles credit and debt obligations. Creditworthiness is typically determined based on various factors that relate to how the applicant has dealt with credit in the past, such as an overall credit report, a credit score, and/or a repayment history.

SUMMARY

Some implementations described herein relate to a system for estimating creditworthiness. The system may include one or more memories and one or more processors communicatively coupled to the one or more memories. The one or more processors may be configured to obtain access to an email account associated with an applicant based on the applicant having insufficient domestic historical data for a credit request of the applicant to be processed. The one or more processors may be configured to identify, using one or more machine learning models, a set of email messages included in the email account that are relevant to the credit request. The one or more processors may be configured to analyze content included in the set of email messages using natural language processing to generate non-domestic historical data associated with the applicant. The one or more processors may be configured to determine a set of metrics that relate to an estimated creditworthiness of the applicant based on the non-domestic historical data associated with the applicant. The one or more processors may be configured to generate a decision on the credit request based on the set of metrics that relate to the estimated creditworthiness of the applicant.

Some implementations described herein relate to a method for estimating creditworthiness. The method may include receiving, by a credit decision platform, a credit request from an applicant. The method may include obtaining, by the credit decision platform, domestic historical data associated with the applicant from one or more credit bureau devices. The method may include obtaining, by the credit decision platform, access to an email account associated with the applicant based on determining that the domestic historical data associated with the applicant is insufficient to process the credit request. The method may include identifying, by the credit decision platform, a set of email messages included in the email account that are relevant to the credit request. The method may include analyzing, by the credit decision platform, content included in the set of email messages using natural language processing to generate non-domestic historical data associated with the applicant. The method may include generating, by the credit decision platform, a decision on the credit request based on an estimated creditworthiness of the applicant, where the estimated creditworthiness of the applicant is determined based on the non-domestic historical data.

Some implementations described herein relate to a non-transitory computer-readable medium that stores a set of instructions for a system. The set of instructions, when executed by one or more processors of the system, may cause the system to obtain access to an email account associated with an applicant based on the applicant having insufficient domestic historical data for a credit request of the applicant to be processed. The set of instructions, when executed by one or more processors of the system, may cause the system to identify, using one or more machine learning models, a set of email messages included in the email account that are relevant to the credit request. The set of instructions, when executed by one or more processors of the system, may cause the system to analyze content included in the set of email messages using natural language processing to generate non-domestic historical data associated with the applicant. The set of instructions, when executed by one or more processors of the system, may cause the system to determine a set of metrics that relate to an estimated creditworthiness of the applicant based on the non-domestic historical data associated with the applicant. The set of instructions, when executed by one or more processors of the system, may cause the system to map the set of metrics to a credit score. The set of instructions, when executed by one or more processors of the system, may cause the system to obtain information related to income or assets associated with the applicant. The set of instructions, when executed by one or more processors of the system, may cause the system to generate a decision on the credit request based on the credit score and the information related to the income or assets associated with the applicant.

DETAILED DESCRIPTION

The following detailed description of example implementations refers to the accompanying drawings. The same reference numbers in different drawings may identify the same or similar elements.

When a credit applicant submits a credit request (e.g., a loan or credit application or a request to pre-qualify for a credit product), a lender or creditor (e.g., a bank, a credit union, a mortgage company, a vehicle financing company, and/or a credit card company) typically evaluates a creditworthiness of the applicant to determine whether to extend credit to the applicant and/or to determine credit terms (e.g., an interest rate, a loan amount, and/or a credit limit) that the lender or creditor is willing to offer. In particular, creditworthiness generally refers to a measure (e.g., a probability of default) that lenders or creditors use to determine how well a credit applicant handles credit and debt obligations, which is typically determined based on an overall credit report, a credit score, a repayment history, and/or other factors that relate to how the applicant has dealt with credit in the past and/or the applicant's ability to repay debt (e.g., assets available and/or a number of liabilities, among other examples). However, one challenge that may arise when evaluating the creditworthiness of a credit applicant is that certain applicants may have an insufficient domestic credit history in a country or region where credit is sought.

For example, a potential borrower with an insufficient credit history essentially has little or no proven track record that lenders or creditors can refer to in order to assess the creditworthiness of the potential borrower (e.g., distinct from a bad credit history that may include past due payments and/or collection actions, among other examples). For example, a potential borrower may have an insufficient credit history when a credit reporting agency (or credit bureau) has no credit record for the potential borrower, or when the credit record for the potential borrower does not contain enough accounts, a sufficient payment history, or recently reported activity to calculate a reliable credit score. In some cases, young or inexperienced borrowers may have insufficient credit histories because building a credit history by making consistent payments can take significant time (e.g., several years). However, in other cases, a potential borrower may have a sufficient credit history that is inaccessible to an institution attempting to render a credit decision for the potential borrower. For example, when a person with an extensive credit history in a home country moves to a different country, the credit history (including credit score) in the home country is not portable to the new country (e.g., due to variations in data protection laws and/or differences in how credit scoring and credit reports work in different countries). As a result, because a lender or creditor typically only has access to data related to a domestic credit history and lacks access to non-domestic credit reporting agencies or other data sources that may provide a non-domestic credit history, experienced borrowers that may be good credit risks (e.g., have a low probability of default and/or have demonstrated an ability to make consistent debt payments over time) may be unable to obtain a vehicle loan, a mortgage, a credit card, and/or other credit products.

Some implementations described herein relate to a credit decision platform that may use an email history to estimate a creditworthiness for a loan or credit applicant that has an insufficient credit history. For example, in some implementations, the credit decision platform may receive a credit request from an applicant and may attempt to obtain domestic credit history data associated with the applicant (e.g., a credit report, a credit score, and/or a repayment history) from one or more credit bureau devices. In cases where the credit decision platform determines that the domestic credit history data is insufficient to process or otherwise render a decision on the credit request, the credit decision platform may obtain access to an email account associated with the applicant (e.g., using a token-based authorization or access delegation framework) and may analyze email messages in the email account that may include information relevant to a non-domestic credit history (e.g., payments made, collection notices, estimated credit, and/or an oldest account, among other examples) in order to estimate a creditworthiness of the applicant. In addition, the credit decision platform may use one or more machine learning models and/or artificial intelligence techniques to determine whether the email account is authentic (e.g., an email account used by a real person) or synthetic (e.g., an email account operated by a bot or fraudster with the intention to fraudulently obtain credit) and/or to determine whether individual emails in the email account are authentic or synthetic. In this way, the credit decision platform may use the information in the email account to obtain data that can be used to estimate the creditworthiness of a credit applicant in cases where domestic historical credit data accessible through credit bureaus or credit reporting agencies is insufficient to process a credit request. In this way, the credit decision platform may obtain and/or verify data associated with the email account that indicates the credit history of the credit application, which may conserve resources that may otherwise be consumed if the credit applicant were required to manually attempt to prove a credit history during interactions with customer service agents.

Figure 1A:
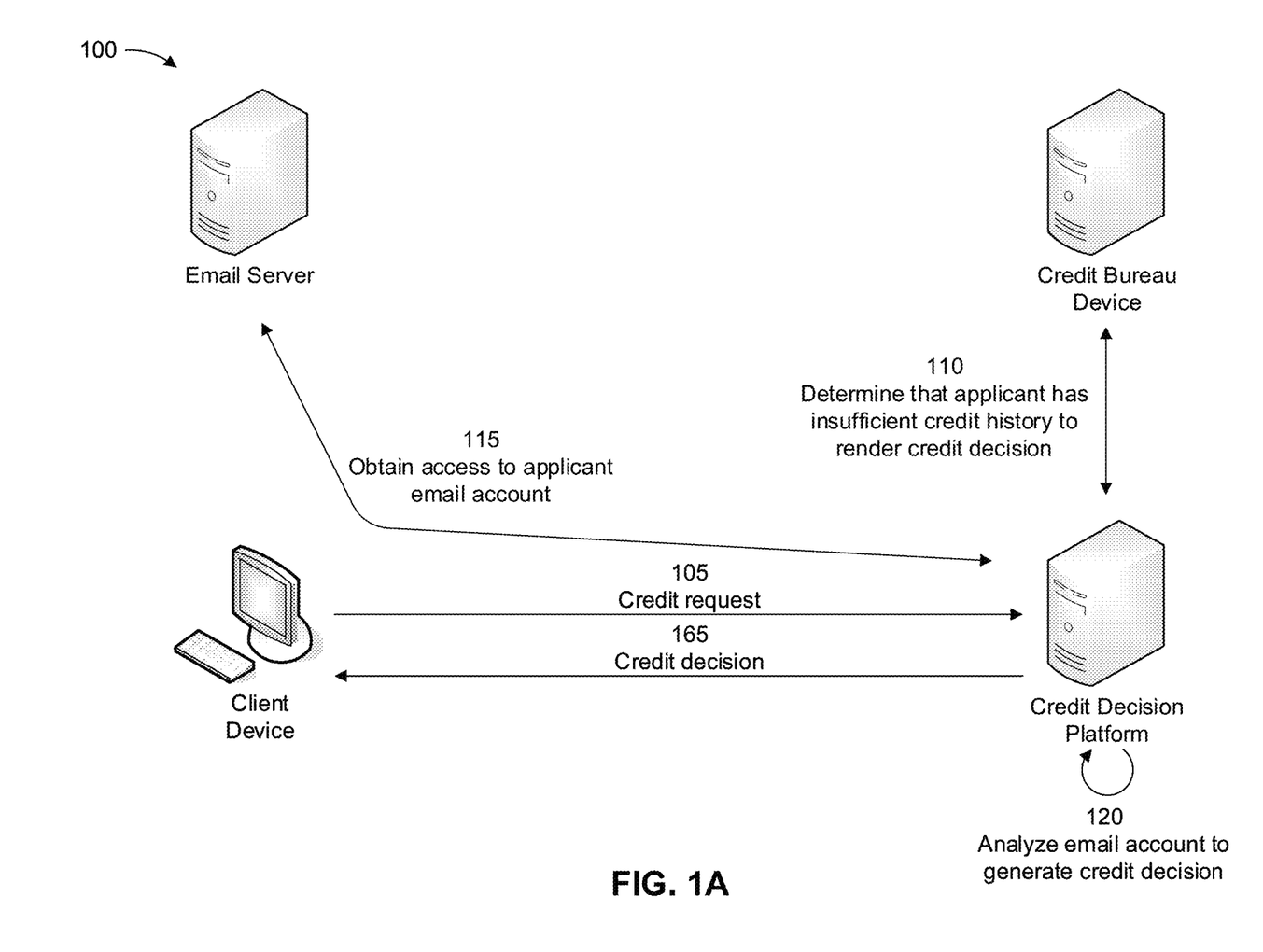
FIGS. 1A-1B are diagrams illustrating an example associated with using an email history to estimate creditworthiness for applicants that have an insufficient credit history.
Figure 1B:
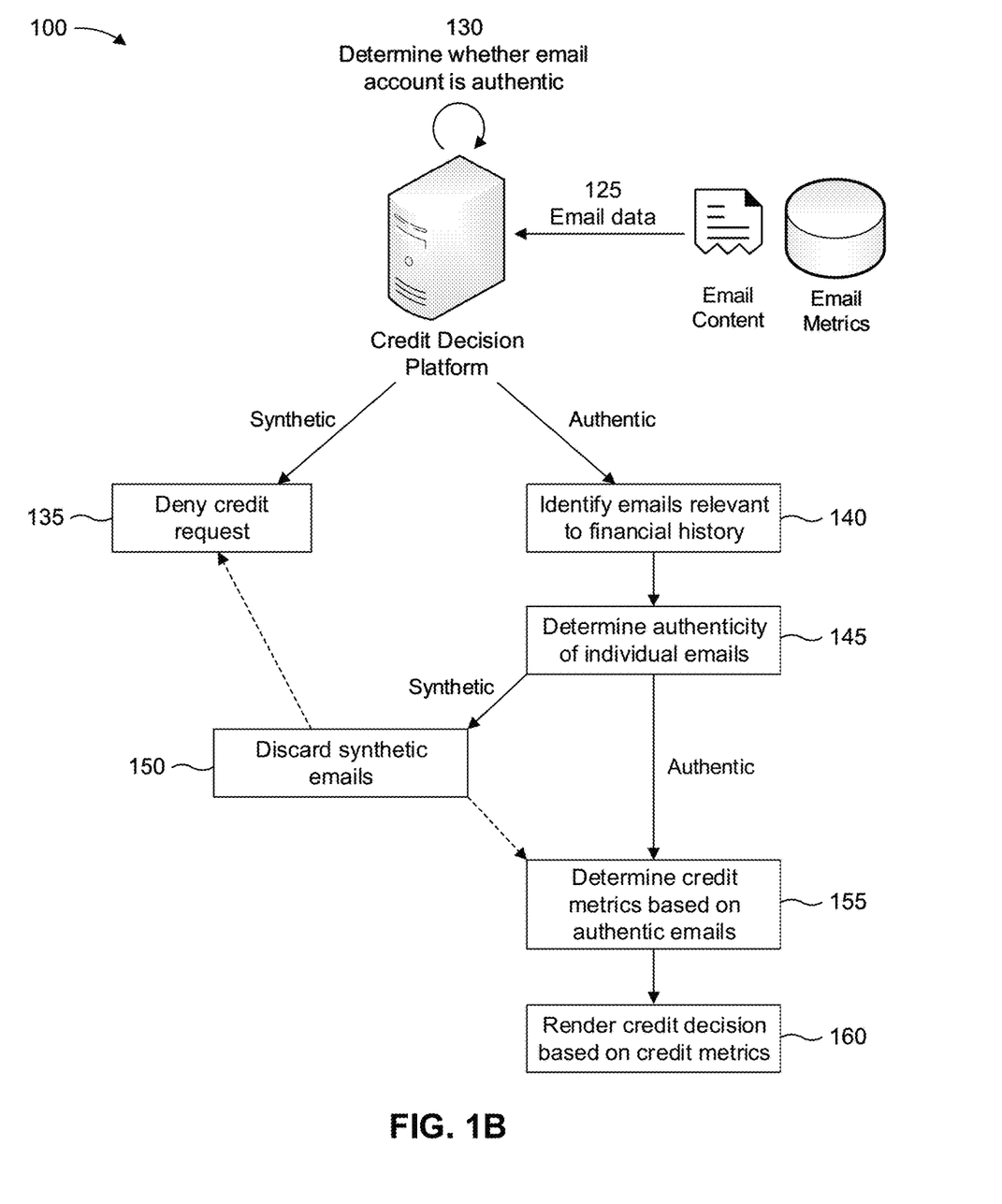

FIGS. 1A-1B are diagrams of an example 100 associated with using an email history to estimate creditworthiness for applicants that have an insufficient credit history. As shown in FIGS. 1A-1B, example 100 includes a credit decision platform, a client device, a credit bureau device, and an email server. The credit decision platform, the client device, the credit bureau device, and the email server are described in more detail in connection with FIG. 3.

As shown in FIG. 1A, and by reference number 105, the credit decision platform may receive a credit request from a client device. For example, in some implementations, the credit request may include an application for a credit product (e.g., a vehicle loan, a mortgage loan, a home equity loan, a student loan, a personal loan, a line of credit, and/or a credit card, among other examples), a request to pre-qualify for a credit product, and/or a request to increase an amount of available credit, among other examples. In some implementations, the credit request may include detailed information about the applicant, such as a name, a mailing address, birth date, annual income, residential status (e.g., whether the applicant rents or owns a home and/or the monthly rent or mortgage payment), and/or an approximate amount that the applicant spends on recurring debt payments and/or credit cards per month. In addition, the credit request may typically include one or more identifiers to enable the credit decision platform to obtain domestic historical data associated with the applicant (e.g., a social security number in the United States, an electoral number in the United Kingdom, or a similar identifier that uniquely identifies a person for cases of credit access and monitoring).

As further shown in FIG. 1A, and by reference number 110, the credit decision platform may communicate with a credit bureau device to request and/or obtain domestic credit history data associated with the applicant (e.g., credit history data in a country where a lender or creditor operating the credit decision platform issues credit). For example, the credit bureau device may be associated with one or more data collection agencies that collect, from various creditors, credit history information relating to individual borrowing and bill-paying habits (e.g., existing debts, payment histories, payment delinquencies, and/or monthly payments, among other examples), which is made available to private lenders, consumer reporting agencies, credit reference agencies, credit reporting bodies, and/or other institutions. Accordingly, in some implementations, the credit decision platform may request, from the credit bureau device, credit history data that includes a credit report and/or a credit score associated with the applicant, which is typically used to evaluate the creditworthiness of a credit applicant. For example, a credit report may include information such as total debt that an individual carries, open and closed accounts, credit limits, current account balances, past due amounts, defaults, bankruptcies, and/or debt collection actions, among other examples. Furthermore, a credit score measures creditworthiness on a numerical scale (e.g., between 300 and 850 in the United States, between 300 and 900 in Canada), and is typically based on factors such as a payment history, amounts owed, and/or a length of credit history, among other examples.

In some implementations, as described herein, the credit decision platform may determine that domestic historical data associated with the applicant that is accessible through the credit bureau device is insufficient to process or otherwise render a decision on the credit request. For example, the credit bureau device may have no domestic historical data for the applicant, the domestic historical data may contain a number of accounts that fail to satisfy a threshold or accounts with an age that fails to satisfy a threshold (e.g., too few accounts or accounts that are too new to calculate a reliable credit score), or the domestic historical data may be considered stale due to a lack or an insufficient amount of recently reported activity. In such cases, the credit decision platform may determine that the domestic credit data accessible through the credit bureau device is insufficient to process or otherwise render a decision on the credit request. However, in some cases, the applicant may be an expatriate or immigrant with an extensive credit history in a home country (e.g., a non-domestic country from the perspective of a lender or creditor operating the credit decision platform) or the applicant may have a history of obtaining credit from non-traditional credit sources that generally do not report information to a credit reporting agency that operates the credit bureau device (e.g., a payday or auto-title lender).

Accordingly, in some implementations, the credit decision platform may use an email history associated with the applicant as an additional and/or alternative source of credit history data for the applicant when the domestic historical data accessible through the credit bureau device is insufficient to process or otherwise render a decision on the credit request. For example, in many cases, a person may have one or more email accounts that have been open for a significant length of time (e.g., several years or more), whereby an email history spanning the length of time that email account has been open may include many email messages that are relevant to a credit history. Furthermore, many people save, archive, or otherwise preserve email messages rather than deleting email messages, or deleted email messages may be soft deleted or otherwise accessible after deletion (e.g., in an unemptied trash folder), whereby an email history may potentially contain substantial information about the financial behavior of a credit applicant. Accordingly, as described herein, the credit decision platform may use the email history of the applicant as a proxy data source (e.g., an additional and/or alternative source of credit history data) to estimate the creditworthiness of the applicant.

As shown in FIG. 1A, and by reference number 115, the credit decision platform may obtain access to the email account associated with the applicant based on determining that the domestic historical data accessible through the credit bureau device is insufficient to process or otherwise render a decision on the credit request. For example, in some implementations, the credit decision platform may obtain access to the email account associated with the applicant using a token-based or credential-based delegation framework (e.g., Open Authorization or "OAuth"). For example, the credit decision platform may obtain access to the email account associated with the applicant by sending a message to the client device to request access to the email account associated with the applicant, or the message requesting access may be sent to the client device indirectly via an email server that supports the email account. Based on the applicant approving the request for access to the email account, the credit decision platform may receive an authorization grant (e.g., a credential or token that represents the applicant's authorization) to access the applicant's email account, which may be configured as an authorization code, an implicit grant, password credentials, or client credentials. In some implementations, the credit decision platform may then provide the authorization grant to the email server to request an access token, and the email server may return the access token to the credit decision platform based on verifying the authorization grant. For example, in some implementations, the access token may include a string or other suitable credentials that indicate a specific scope, lifetime, and/or other access attributes associated with the applicant email account. Accordingly, the credit decision platform can present the access token to the email server to request access to the email account associated with the applicant, and the email server may provide access to the applicant email account based on validating the access token.

As further shown in FIG. 1A, and by reference number 120, the credit decision platform may analyze the email account associated with the applicant in order to generate a credit decision for the applicant. More particularly, as shown in FIG. 1B, and by reference number 125, the credit decision platform may obtain, from the email server, content and/or metrics associated with the email account of the applicant. In some implementations, the email content may include all of the email messages in the email account or a subset of the email messages in the email account that satisfy one or more conditions related to time, content, status, or type. For example, in order to reduce the amount of email data that needs to be analyzed to render the credit decision, reduce communication overhead or delays associated with downloading email data from the email server, and/or comply with any privacy settings specified by the applicant and/or regulations, the credit decision platform may request, from the email server, only a subset of the email messages in the email account that satisfy the condition(s) related to time, content, status, or type. For example, the credit decision platform may request email messages with timestamps dated within a certain time period, such as a most recent quantity of years, to establish a recent credit history, may request a quantity of email messages that are sufficient to obtain a representative sample of the email account, may request email messages that include certain words or phrases (e.g., words or phrases related to financial activities, such as "receipt," "payment," "statement," and/or "past due"), and/ or may request email messages sent from or to certain sender domains, among other examples. Furthermore, as shown, the email data obtained from the email server may include email metrics that the credit decision platform can use to determine whether the email account is authentic (e.g., a real email account that is used by a person) or synthetic (e.g., an email account that is operated by a bot or a fraudster with the intention to fraudulently obtain credit). For example, in some implementations, the email metrics may include a longevity of the email account (e.g., a length of time that the email account has been active), a number or ratio of personal correspondences, a rate at which email messages are opened or read, a duration of time that email messages are opened, and/or an unsubscribe rate, among other examples.

For example, as further shown in FIG. 1B, and by reference number 130, the credit decision platform may determine whether the email account is authentic or synthetic based on the email content and/or the email metrics obtained from the email server. In particular, as described herein, the email content obtained from the email server may generally include text associated with email messages downloaded from the email server, attachments to the email messages downloaded from the email server, and/or metadata associated with the email messages downloaded from the email server (e.g., sender domains, timestamps, subject lines, forward and/or reply statuses, labels or flags applied to the email messages, folders in which the email messages are archived, importance indicators, read status, and/or information in a cc field and/or a bcc field, among other examples). Furthermore, as described elsewhere herein, the email metrics may include various statistics or other indicators that may relate to patterns associated with the email messages in the email account and/or user behaviors that occur during interactions with the email account.

Accordingly, in some implementations, the credit decision platform may use one or more machine learning models that are trained to distinguish authentic email accounts from synthetic (e.g., fraudulent) email accounts in order to determine whether the email account is authentic or synthetic. As described in more detail below in connection with FIG. 2, a set of inputs to the one or more machine learning models may include one or more metrics associated with the email account and/or data obtained from the email content, and the one or more machine learning models may generate an output that indicates whether the email account is authentic or synthetic based on the set of inputs. For example, an absence or a small number of personal correspondences may be an indicator that the email account is potentially synthetic because a real person is likely to receive at least some personal emails. In another example, a longevity of the account may be an indicator of whether the email account is authentic or synthetic because many people use the same email account for many years (e.g., an email account with a short longevity may be an indicator that the email account was recently created to obtain credit outside the typical approval process that relies upon a domestic credit history from the credit bureau device). In other examples, the machine learning model(s) may be trained to predict whether the email account is authentic or synthetic based on factors such as a pattern of received emails (e.g., whether certain senders, sender domains, receipts, and/or other indicators appear consistently or whether there are gaps in the consistency), email header information (e.g., whether Internet Protocol (IP) addresses or domains indicate the applicant is receiving emails from around the world, including a non-domestic country where the applicant asserts to have a credit history), how email messages marked as spam are handled (e.g., marking email messages as not spam may be a potential indicator that the email account is synthetic), and/or patterns that relate to reading behavior (e.g., a number of email messages that are read or marked read and/or a duration that email messages are open on average, as a short reading duration such as less than one second may be an indicator that a bot is crawling through the email account to create the appearance that email messages as being read), among other examples. In another example, if the credit decision platform determines that the email account being used to provide the credit history data was previously used to obtain credit, the credit decision platform may determine that the email account is likely synthetic (e.g., either the current attempt or the previous attempt to use the email account is likely fraudulent).

Accordingly, in some implementations, the credit decision platform may use the one or more machine learning models to determine whether the email account is authentic or synthetic based on a set of inputs that generally relate to overall patterns associated with the email messages in the email account and/or overall patterns that relate to user interactions (including a lack of user interactions) with the email messages in the email account. In this way, as shown in FIG. 1B, and by reference number 135, the credit decision platform may deny the credit request from the applicant based on the machine learning model(s) generating an output that indicates that the email account appears to be synthetic (e.g., a probability that the email account is synthetic satisfies a threshold and/or a probability that the email account is authentic fails to satisfy a threshold). In this way, the credit decision platform may deny credit requests in cases where a credit applicant has apparently created an email account and/or generated an email history in order to fraudulently obtain credit. Alternatively, as shown by reference number 140, the credit decision platform may identify, among the email messages downloaded from the email server, a set of email messages that are relevant to a financial history of the applicant based on the output from the machine learning model(s) indicating that the email account is authentic.

For example, in some implementations, the credit decision platform may be configured to read and parse through the email messages downloaded from the email server and to analyze metadata associated with the downloaded email messages in order to identify email messages that may be relevant to the financial history of the applicant. For example, the credit decision platform may identify email messages in which a sender or recipient is associated with a payment service (e.g., a utility company, a mortgage company, a bank, and/or a service provider such as PayPal or Venmo), which may be identified based on the sender name and/or the sender domain, among other examples. Additionally, or alternatively, the credit decision platform may apply natural language processing or other suitable techniques to identify certain words or phrases that relate to financial activities or behaviors and/or have a semantic meaning indicating that the email content is likely relevant to financial activities or behaviors (e.g., a bill that is due, a late or missed payment, or a repayment of an interpersonal loan, among other examples). In another example, the credit decision platform may employ a template-based algorithm to identify email messages that are potentially relevant to the financial history of the applicant. For example, certain senders may structure emails that relate to payment reminders, payment confirmations, collection actions, and/or other financial matters using a known or otherwise predictable format, and the credit decision platform may parse email messages from such senders using templates that are based on the known format used by such senders in order to extract or otherwise identify data relevant to the financial history of the applicant. In another example, the credit decision platform may identify email messages relevant to a financial history using one or more machine learning models that are trained to recognize email messages relevant to financial matters. Furthermore, in cases where the email messages include content that is in a different language than used by the natural language processing, the template-based parsing, and/or the machine learning model(s) (e.g., because the applicant may be attempting to prove a non-domestic credit history), the credit decision platform may translate or may invoke a translation service to translate or otherwise reformat any foreign language content into the language used by the natural language processing, the template-based parsing, and/or the machine learning model(s). Accordingly, as described herein, the credit decision platform may use one or more techniques or a combination of techniques (e.g., applying filtering, natural language processing, template-based parsing, and/or trained machine learning models) to identify a set of email messages that may be relevant to the financial history of the applicant (e.g., made or scheduled payments, missed or cancelled payments, mortgage payments, loan payments, open financial accounts, loan defaults, late fees, payments in arrears, collection actions, a current or historic estimated open credit line, paystubs or other income information, and/or general spending information, among other examples).

As further shown in FIG. 1B, and by reference number 145, the credit decision platform may determine, for each individual email message identified as potentially relevant to the financial history of the credit applicant, whether the individual email message is authentic or synthetic. For example, in some implementations, the credit decision platform may use one or more machine learning models that are trained to recognize whether an email message is related to a legitimate financial history or likely synthetic (e.g., created or formatted to falsely create the appearance of a legitimate payment, account balance, or other financially relevant information). For example, in some implementations, the machine learning model(s) may be trained using supervised learning with training data that includes authentic and synthetic email messages. Accordingly, as shown by reference number 150, the credit decision platform may discard any email messages that the machine learning model(s) indicate to be synthetic. Additionally, or alternatively, the credit decision platform may count synthetic email messages and deny the credit request based on the quantity of synthetic email messages satisfying a threshold. In another example, the credit decision platform may deny the credit request based on a threshold quantity of the email messages being from a sender or a sender domain known to send spoofed or otherwise fraudulent email messages that create the appearance of a credit history.

As further shown in FIG. 1B, and by reference number 155, the credit decision platform may determine one or more credit metrics associated with the applicant based on a subset of the financially-relevant email messages that are determined to be authentic. For example, in some implementations, the credit metrics may include similar information that the credit decision platform would normally obtain from a credit report and/or credit score obtained from the credit bureau device, such as whether the applicant is making payments on time, how many lenders or creditors the applicant is paying on time, a number of late payments, sums of money that the applicant regularly pays in a given time interval (e.g., per month or per year), account balances (e.g., individual and total account balances), a length of credit history (e.g., an oldest account), a number of open accounts, available credit, credit usage (e.g., a percentage of total available credit that is used), a number of credit checks, and/or a number of defaults or collections, among other examples. In this way, the email history may be used to derive a credit history associated with the applicant in cases where the domestic credit history of the applicant (e.g., the credit report and/or credit score of the applicant) is insufficient to process the credit request. Furthermore, in some implementations, the credit metrics that are determined based on the email history may include information related to an income of the applicant or assets available to the applicant, which may be indicative of the applicant's ability to make payments on time.

As further shown in FIG. 1B, and by reference number 160, the credit decision platform may generate a decision on the credit request based on the credit metrics. For example, as described herein, the credit decision platform may use the credit metrics to estimate a creditworthiness of the applicant, which may be mapped to a credit score in a similar manner as information contained in a credit report. For example, in some implementations, the credit decision platform may apply a credit scoring algorithm that assigns respective weights to a payment history metric, a credit history metric, a credit usage metric, a total balance metric, a credit check metric, an available credit metric, and/or other suitable metrics that may impact a credit score. In this way, the credit decision platform may remap the credit history data obtained from the email history to an approval flow that is based on a domestic credit history obtained from the credit bureau device. Furthermore, in some implementations, the credit decision platform may obtain information related to income or assets available to the applicant (e.g., based on the initial application provided by the applicant, the email history, and/or uploaded documents that include paystubs, bank statements, and/or other evidence of income or assets). In this way, the credit decision platform may render a credit decision based on the applicant's credit history that is proven based on the email history and/or the applicant's verified income or assets. For example, in some implementations, the credit decision platform may generate a decision to grant the credit request (e.g., based on the email history proving a good credit history and/or based on the applicant's sufficient income or assets to reliably make payments) or to deny the credit request (e.g., based on the email history proving a poor credit history or having insufficient data to prove a credit history and/or based on the applicant having insufficient income or assets).

Furthermore, in cases where the credit request is a joint credit request with another applicant having insufficient domestic credit history, the credit decision platform may follow a similar flow to obtain access to the email account associated with the joint applicant and estimate the creditworthiness of the joint applicant based on the email history. In such cases, the credit decision platform may generate the decision on the joint credit request based on a cross-referencing of the credit histories that are proven using the email histories of the respective joint applicants (e.g., considering combined income and assets, combined payment histories, and/or combined account balances and/or filtering out duplicate entries, among other examples).

As further shown in FIG. 1A, and by reference number 165, the credit decision platform may return a credit decision to the client device that originated the credit request. For example, in some implementations, the credit decision returned to the client device may indicate whether the credit request is granted or denied. In some implementations, in cases where the credit decision indicates that the credit request is granted, the information returned to the client device may further indicate one or more terms associated with the credit that may be extended to the applicant (e.g., an interest rate, a credit line, a loan amount, and/or a number of repayments, among other examples). In such cases, the credit decision platform may further provide the client device with an option to initiate further steps to open a credit account and/or to verify credit history information, income information, and/or asset information that may have been gleaned from the email history. In this way, the credit decision platform may evaluate the creditworthiness of the applicant using the email history and enable the applicant to acquire and build credit in cases where the applicant does not have a sufficient domestic credit history.

Additionally, or alternatively, in cases where the credit decision returned to the client device indicates that the credit request is denied, the credit decision platform may present a user interface that may indicate the reason why the credit request was denied and/or provide an option to submit additional information to prove a credit history or ability to pay. For example, in some implementations, the decision returned to the client device may indicate that the credit request was denied due to the email account appearing to be synthetic or having a threshold number of email messages appearing to be synthetic. Additionally, or alternatively, the decision returned to the client device may indicate that the credit request was denied due to the email account indicating a poor credit history and/or having insufficient information to estimate the creditworthiness of the applicant. In such cases, the applicant may be provided with an option to prove that the determination that the email account or certain email messages were not synthetic and/or to submit documentation that may prove a payment history or ability to pay. In this way, the credit decision platform may implement various safeguards to prevent extending credit to fraudsters and/or people that may be attempting to hide a poor non-domestic credit history.

As indicated above, FIGS. 1A-1B are provided as an example. Other examples may differ from what is described with regard to FIGS. 1A-1B.

Figure 2:
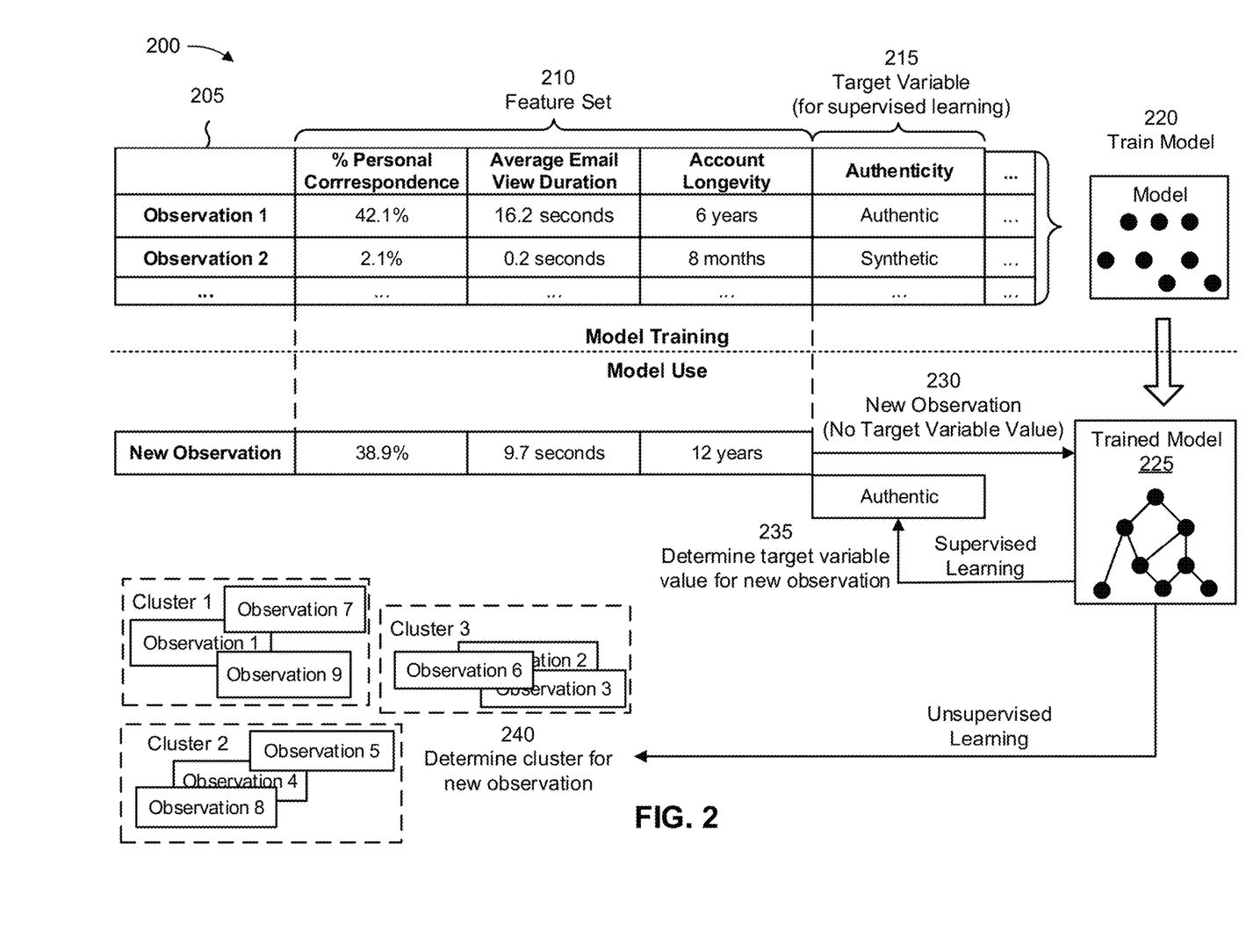
FIG. 2 is a diagram illustrating an example of training and using a machine learning model in connection with using an email history to estimate creditworthiness for applicants that have an insufficient credit history.

FIG. 2 is a diagram illustrating an example 200 of training and using a machine learning model in connection with using an email history to estimate creditworthiness for applicants that have an insufficient credit history. The machine learning model training and usage described herein may be performed using a machine learning system. The machine learning system may include or may be included in a computing device, a server, a cloud computing environment, or the like, such as the credit decision platform described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the email server, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the email server. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a percentage of personal correspondences, a second feature of an average email view duration, a third feature of an account longevity, and so on. As shown, for a first observation, the first feature may have a value of 42.1%, the second feature may have a value of 16.2 seconds, the third feature may have a value of 6 years, and so on. These features and feature values are provided as examples and may differ in other examples. For example, the feature set may include one or more of the features described above in connection with FIGS. 1A-1B.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is authenticity of the email account, which has a value of authentic for the first observation.

The feature set and target variable described above are provided as examples, and other examples may differ from what is described above. For example, for a target variable of authenticity of an individual email message, the feature set may include a sender, a sender domain, a timestamp, a subject, and/or a relevance to financial history, among other examples. Additionally, or alternatively, for a target variable of credit score or credit decision, the feature set may include a payment history metric, a credit history metric, a credit usage metric, a total balance metric, a credit check metric, and/or an available credit metric, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of 38.9% personal correspondences, a second feature of 9.7 seconds average view duration, a third feature of 12 years account longevity, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of authentic for the target variable of authenticity of the email account for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to proceed with identifying email messages in the email account that are relevant to a financial history of an applicant associated with the email account. The first automated action may include, for example, identifying email messages in the email account that are relevant to the financial history of the applicant associated with the email account and/or determining whether individual email messages in the email account are authentic or synthetic.

As another example, if the machine learning system were to predict a value of synthetic for the target variable of authenticity of the email account, then the machine learning system may provide a second (e.g., different) recommendation (e.g., deny the credit request) and/or may perform or cause performance of a second (e.g., different) automated action (e.g., add the email account to a list of potentially fraudulent email addresses).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., authentic email accounts), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., suspicious email accounts), then the machine learning system may provide a second (e.g., different) recommendation (e.g., request information to further assess whether the email account is authentic or synthetic) and/or may perform or cause performance of a second (e.g., different) automated action, such as limiting a maximum credit that can be extended to the applicant associated with the suspicious email account.

In some implementations, the recommendation and/or automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine whether an email account is authentic or synthetic, to identify email messages that are relevant to a financial history, to determine whether individual email messages are authentic or synthetic, and/or to determine a credit score or estimate a creditworthiness of an applicant with insufficient domestic credit history data. The machine learning system enables recognition and/or identification of tens, hundreds, thousands, or millions of features and/or feature values for tens, hundreds, thousands, or millions of observations, thereby increasing accuracy and consistency and reducing delay relative to requiring computing resources to be allocated for tens, hundreds, or thousands of operators to manually determine whether an email account is authentic or synthetic, to identify email messages that are relevant to a financial history, to determine whether individual email messages are authentic or synthetic, and/or to determine a credit score or estimate a creditworthiness of an applicant with insufficient domestic credit history data using the features or feature values.

As indicated above, FIG. 2 is provided as an example. Other examples may differ from what is described in connection with FIG. 2.

Figure 3:
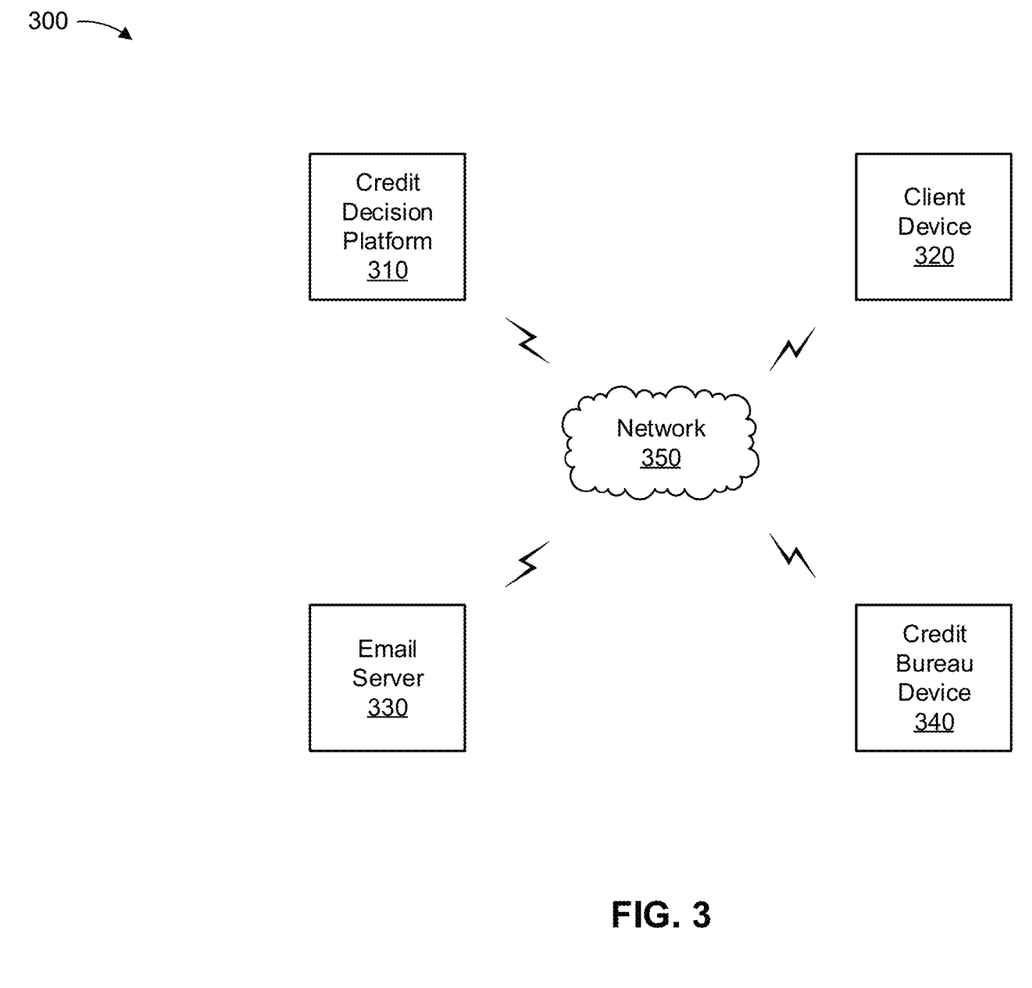
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a credit decision platform 310, a client device 320, an email server 330, a credit bureau device 340, and a network 350. Devices of environment 300 may interconnect via wired connections, wireless connections, or a combination of wired and wireless connections.

The credit decision platform 310 includes one or more devices capable of receiving, generating, storing, processing, providing, and/or routing information associated with using an email history to estimate creditworthiness for applicants that have an insufficient domestic credit history, as described elsewhere herein. The credit decision platform 310 may include a communication device and/or a computing device. For example, the credit decision platform 310 may include a server, such as an application server, a client server, a web server, a database server, a host server, a proxy server, a virtual server (e.g., executing on computing hardware), or a server in a cloud computing system. In some implementations, the credit decision platform 310 includes computing hardware used in a cloud computing environment.

The client device 320 includes one or more devices capable of receiving, generating, storing, processing, and/or providing information associated with using an email history to prove creditworthiness, as described elsewhere herein. The client device 320 may include a communication device and/or a computing device. For example, the client device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The email server 330 includes one or more devices capable of receiving, generating, storing, processing, providing, and/or routing information associated with an email history of applicants that have an insufficient domestic credit history, as described elsewhere herein. The email server 330 may include a communication device and/or a computing device. For example, the email server 330 may include a server, such as an application server, a client server, a web server, a database server, a host server, a proxy server, a virtual server (e.g., executing on computing hardware), or a server in a cloud computing system. In some implementations, the email server 330 includes computing hardware used in a cloud computing environment.

The credit bureau device 340 includes one or more devices capable of receiving, generating, storing, processing, and/or providing information associated with estimating the creditworthiness of an applicant, as described elsewhere herein. The credit bureau device 340 may include a communication device and/or a computing device. For example, the credit bureau device 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The credit bureau device 340 may communicate with one or more other devices of environment 300, as described elsewhere herein.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
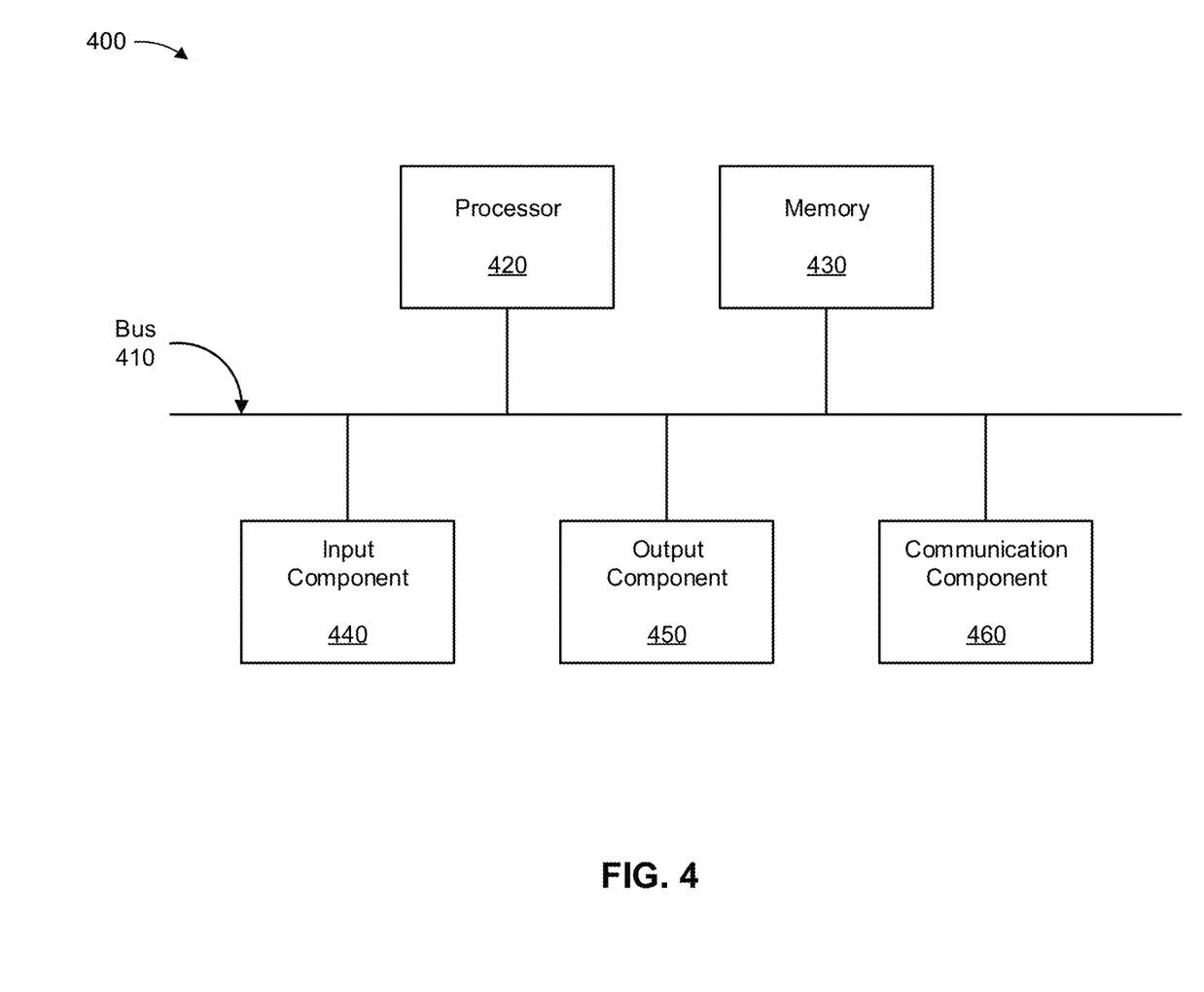
FIG. 4 is a diagram of example components of one or more devices of FIG. 3.

FIG. 4 is a diagram of example components of a device 400, which may correspond to the credit decision platform 310, the client device 320, the email server 330, and/or the credit bureau device 340 described above in connection with FIG. 3. In some implementations, the credit decision platform 310, the client device 320, the email server 330, and/or the credit bureau device 340 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
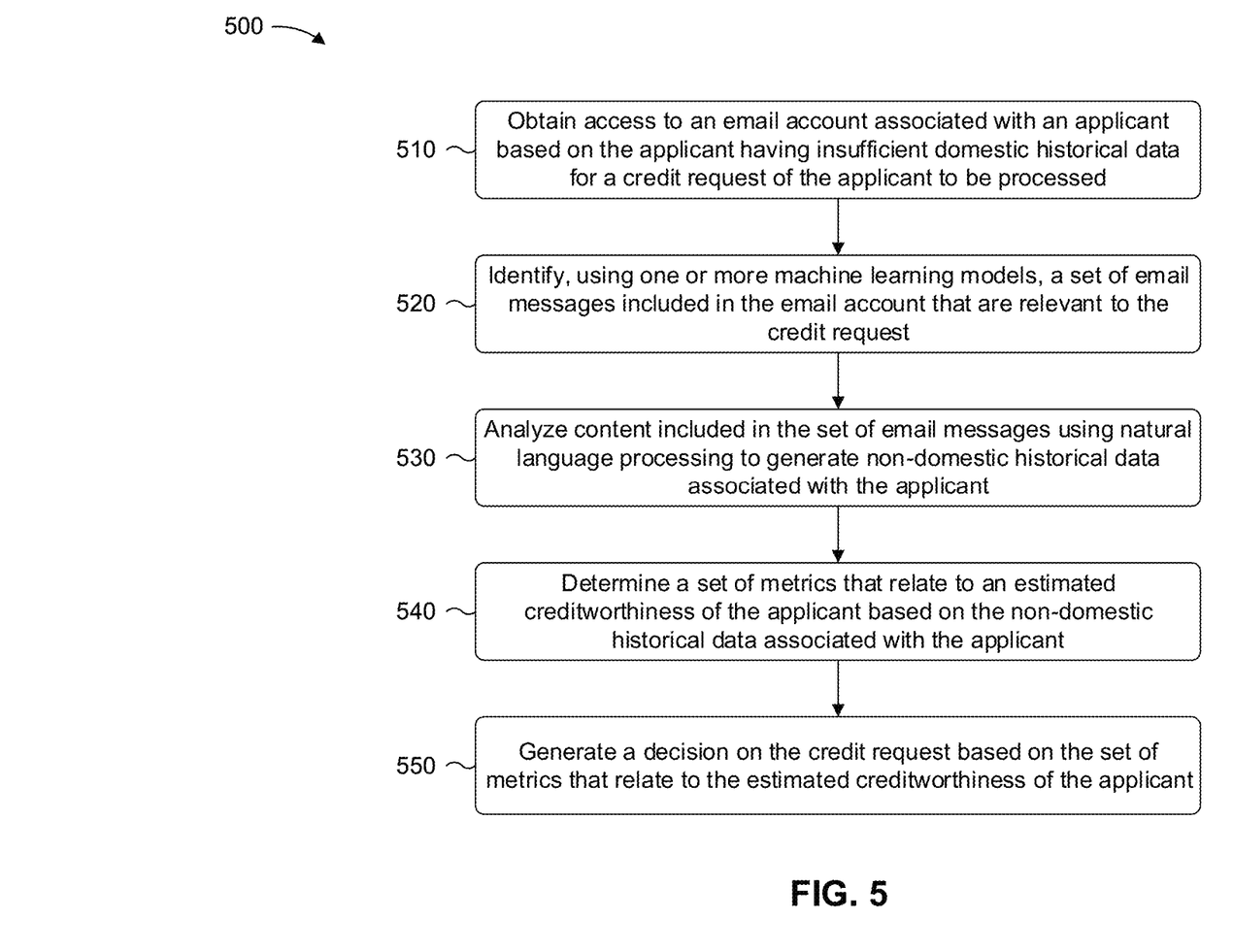
FIG. 5 is a flowchart of an example process relating to using an email history to estimate creditworthiness for applicants that have an insufficient credit history.

FIG. 5 is a flowchart of an example process 500 associated with using an email history to estimate creditworthiness for applicants that have an insufficient domestic credit history. In some implementations, one or more process blocks of FIG. 5 may be performed by a credit decision platform (e.g., credit decision platform 310). In some implementations, one or more process blocks of FIG. 5 may be performed by another device or a group of devices separate from or including the credit decision platform, such as the client device 320, the email server 330, and/or the credit bureau device 340. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include obtaining access to an email account associated with an applicant based on the applicant having insufficient domestic historical data for a credit request of the applicant to be processed (block 510). As further shown in FIG. 5, process 500 may include identifying, using one or more machine learning models, a set of email messages included in the email account that are relevant to the credit request (block 520). In some implementations, the set of email messages relevant to the credit request are identified, using the one or more machine learning models, based on a determination that the email account is authentic. As further shown in FIG. 5, process 500 may include analyzing content included in the set of email messages using natural language processing to generate non-domestic historical data associated with the applicant (block 530). As further shown in FIG. 5, process 500 may include determining a set of metrics that relate to an estimated creditworthiness of the applicant based on the non-domestic historical data associated with the applicant (block 540). As further shown in FIG. 5, process 500 may include generating a decision on the credit request based on the set of metrics that relate to the estimated creditworthiness of the applicant (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for estimating creditworthiness, the system comprising:
   one or more memories; and
   one or more processors, communicatively coupled to the one or more memories, configured to:
      obtain access to an email account associated with an applicant based on the applicant having insufficient domestic historical data for a credit request of the applicant to be processed;
      train a plurality of machine learning models to distinguish authentic email accounts from synthetic email accounts,
         wherein a first machine learning model, of the plurality of machine learning models, is configured to use an input that includes a set of observations from historical data and generate an output that indicates whether the email account is authentic or synthetic using a target variable,
         wherein the set of observations include a feature set which is extracted by a second machine learning model, of the plurality of machine learning models, from the historical data by performing natural language processing, and
         wherein the plurality of machine learning models are trained to recognize patterns in the feature set that lead to a value of the target variable that determines whether the email is authentic or synthetic, and
         wherein the patterns in the feature set include one or more of:
            a pattern of received emails, a pattern of email header information, a pattern of how email messages marked as spam are handled, or
a pattern relating to reading behavior;
identify, using the plurality of trained machine learning models, a set of email messages included in the email account that are relevant to the credit request from an email server,
wherein the set of email messages relevant to the credit request are identified, using the plurality of trained machine learning models, based on a determination that the email account is authentic;
analyze content included in the set of email messages using the plurality of trained machine learning models and the natural language processing to generate non-domestic historical data associated with the applicant;
determine a set of metrics that relate to an estimated creditworthiness of the applicant based on the non-domestic historical data associated with the applicant;
generate a decision that the credit request is granted based on the target variable indicating that emails in the set of email messages are authentic and the set of metrics that relate to the estimated creditworthiness of the applicant; and
provide information to allow the applicant to open a credit account based on the decision.

2. The system of claim 1, wherein the plurality of machine learning models are configured to generate an output that indicates whether the email account is authentic or synthetic based on one or more metrics that relate to patterns associated with email messages included in the email account or patterns in user behaviors that occur during interactions with the email account.

3. The system of claim 1, wherein the credit request is a first credit request, and
wherein the plurality of machine learning models are configured to generate one or more outputs for a second credit request that indicate whether individual email messages in the email account are authentic or synthetic based on content or metadata associated with the individual email messages.

4. The system of claim 3, wherein the second credit request is denied based on the one or more outputs indicating that a threshold number of the individual email messages are synthetic.

5. The system of claim 1, wherein the content included in the set of email messages is analyzed, using the natural language processing to identify words or phrases that relate to financial activities, to identify values associated with the financial activities.

6. The system of claim 1, wherein the one or more processors are further configured to:
determine that at least a portion of the content included in the set of email messages is associated with one or more languages other than a language used in the natural language processing; and
cause the portion of the content to be reformatted or translated into the language used in the natural language processing.

7. The system of claim 1, wherein the applicant is a first applicant, the credit request is a joint credit request with a second applicant having insufficient domestic historical data to process the joint credit request, and the one or more processors are further configured to:
obtain access to an email account associated with the second applicant;
identify, using the plurality of machine learning models, a set of email messages included in the email account associated with the second applicant that are relevant to the credit request;
analyze content included in the set of email messages associated with the second applicant to generate non-domestic historical data associated with the second applicant; and
generate the decision on the joint credit request based on a cross-referencing of the non-domestic historical data associated with the first applicant and the non-domestic historical data associated with the second applicant.

8. The system of claim 1, wherein the one or more processors, when obtaining access to the email account, are configured to:
receive a token that grants access to the email account associated with the applicant; and
provide the token to an email server associated with the email account to obtain access to the email account associated with the applicant.

9. The system of claim 8, wherein the one or more processors are further configured to:
provide, to the email server, a request to obtain email messages included in the email account that satisfy one or more conditions related to time, content, status, or type; and
download, from the email server, email messages included in the email account that satisfy the one or more conditions.

10. The system of claim 1, wherein the one or more processors, when generating the decision on the credit request, are further configured to:
map the estimated creditworthiness of the applicant to a credit score;
obtain, based on one or more of input from the applicant or analysis of content included in the set of email messages, information related to income or assets associated with the applicant; and
generate the decision on the credit request based on the credit score and the information related to the income or assets associated with the applicant.

11. A method for estimating creditworthiness, comprising:
receiving, by a credit decision platform, a credit request from an applicant;
obtaining, by the credit decision platform, domestic historical data associated with the applicant from one or more credit bureau devices;
obtaining, by the credit decision platform, access to an email account associated with the applicant based on determining that the domestic historical data associated with the applicant is insufficient to process the credit request;
training, by the credit decision platform, a machine learning model to distinguish authentic email accounts from synthetic email accounts,
wherein the machine learning model is configured to use an input that includes a set of observations from historical data and generate an output that indicates whether the email account is authentic or synthetic using a target variable,
wherein the set of observations include a feature set which is extracted by another machine learning model from the historical data by performing natural language processing,
wherein the machine learning model is trained to recognize patterns in the feature set that lead to a value of the target variable that determines whether the email is authentic or synthetic, and
wherein the patterns in the feature set include one or more of:
a pattern of received emails,
a pattern of email header information, a pattern of how email messages marked as spam are handled, or
a pattern relating to reading behavior;
identifying, by the credit decision platform and using the trained machine learning model, a set of email messages included in the email account that are relevant to the credit request from an email server,
analyzing, by the credit decision platform, content included in the set of email messages using the trained machine learning model and the natural language processing to generate non-domestic historical data associated with the applicant;
generating, by the credit decision platform, a decision that the credit request is granted based on an estimated creditworthiness of the applicant and based on the target variable indicating that emails in the set of email messages are authentic,
wherein the estimated creditworthiness of the applicant is determined based on the non-domestic historical data; and
providing, by the credit decision platform, information to allow the applicant to open a credit account based on the decision.

12. The method of claim 11, wherein the machine learning model is configured to generate one or more outputs that indicate:
whether the email account is authentic or synthetic based on one or more metrics that relate to patterns associated with email messages included in the email account or patterns in user behaviors that occur during interactions with the email account, and
whether individual email messages in the email account are authentic or synthetic based on content or metadata associated with the individual email messages.

13. The method of claim 12, wherein individual email messages that are indicated to be synthetic are excluded from the set of email messages that are analyzed to generate the non-domestic historical data.

14. The method of claim 11, wherein the decision on the credit request indicates one or more terms associated with credit to be granted to the applicant.

15. The method of claim 11, further comprising:
receiving information that identifies one or more online accounts associated with the applicant that support payment functions; and
including financial activities associated with the one or more online accounts in the non-domestic historical data associated with the applicant.

16. The method of claim 11, wherein generating the decision on the credit request comprises:
mapping the estimated creditworthiness of the applicant to a credit score;
obtaining, based on one or more of input from the applicant or analysis of content included in the set of email messages, information related to income or assets associated with the applicant; and
generating the decision on the credit request based on the credit score and the information related to the income or assets associated with the applicant.

17. A non-transitory computer-readable medium storing a set of instructions, the set of instructions comprising: one or more instructions that, when executed by one or more processors of a system, cause the system to:
obtain access to an email account associated with an applicant based on the applicant having insufficient domestic historical data for a credit request of the applicant to be processed;
train a plurality of machine learning models to distinguish authentic email accounts from synthetic email accounts,
wherein a first machine learning model, of the plurality of machine learning models, is configured to use an input that includes a set of observations from historical data and generate an output that indicates whether the email account is authentic or synthetic using a target variable based on one or more metrics that relate to patterns associated with email messages included in the email account or patterns in user behaviors that occur during interactions with the email account,
wherein the set of observations include a feature set which is extracted by a second machine learning model, of the plurality of machine learning models, from the historical data by performing natural language processing,
wherein the plurality of machine learning models is trained to recognize patterns in the feature set that lead to a value of the target variable that determines whether the email is authentic or synthetic, and
wherein the patterns in the feature set include one or more of:
a pattern of received emails,
a pattern of email header information, a pattern of how email messages marked as spam are handled, or
a pattern relating to reading behavior;
identify, using the plurality of trained machine learning models, a set of email messages included in the email account that are relevant to the credit request from an email server,
analyze content included in the set of email messages using the plurality of trained machine learning models and the natural language processing to generate non-domestic historical data associated with the applicant;
determine a set of metrics that relate to an estimated creditworthiness of the applicant based on the non-domestic historical data associated with the applicant;
map the set of metrics to a credit score;
obtain information related to income or assets associated with the applicant;
generate a decision that the credit request is granted based on the target variable indicating that emails in the set of email messages are authentic; and
provide information to allow the applicant to open a credit account based on the decision.

18. The non-transitory computer-readable medium of claim 17, wherein the credit request is a first credit request and wherein a second credit request is denied based on the plurality of machine learning models indicating that the email account is synthetic.

19. The non-transitory computer-readable medium of claim 17, wherein the one or more instructions further cause the system to generate one or more outputs that indicate whether individual email messages in the email account are authentic or synthetic based on content or metadata associated with the individual email messages.

20. The non-transitory computer-readable medium of claim 17, wherein the content included in the set of email messages is analyzed using the natural language processing to identify words or phrases that relate to financial activities to identify values associated with the financial activities.

* * * * *